Patented Nov. 28, 1933

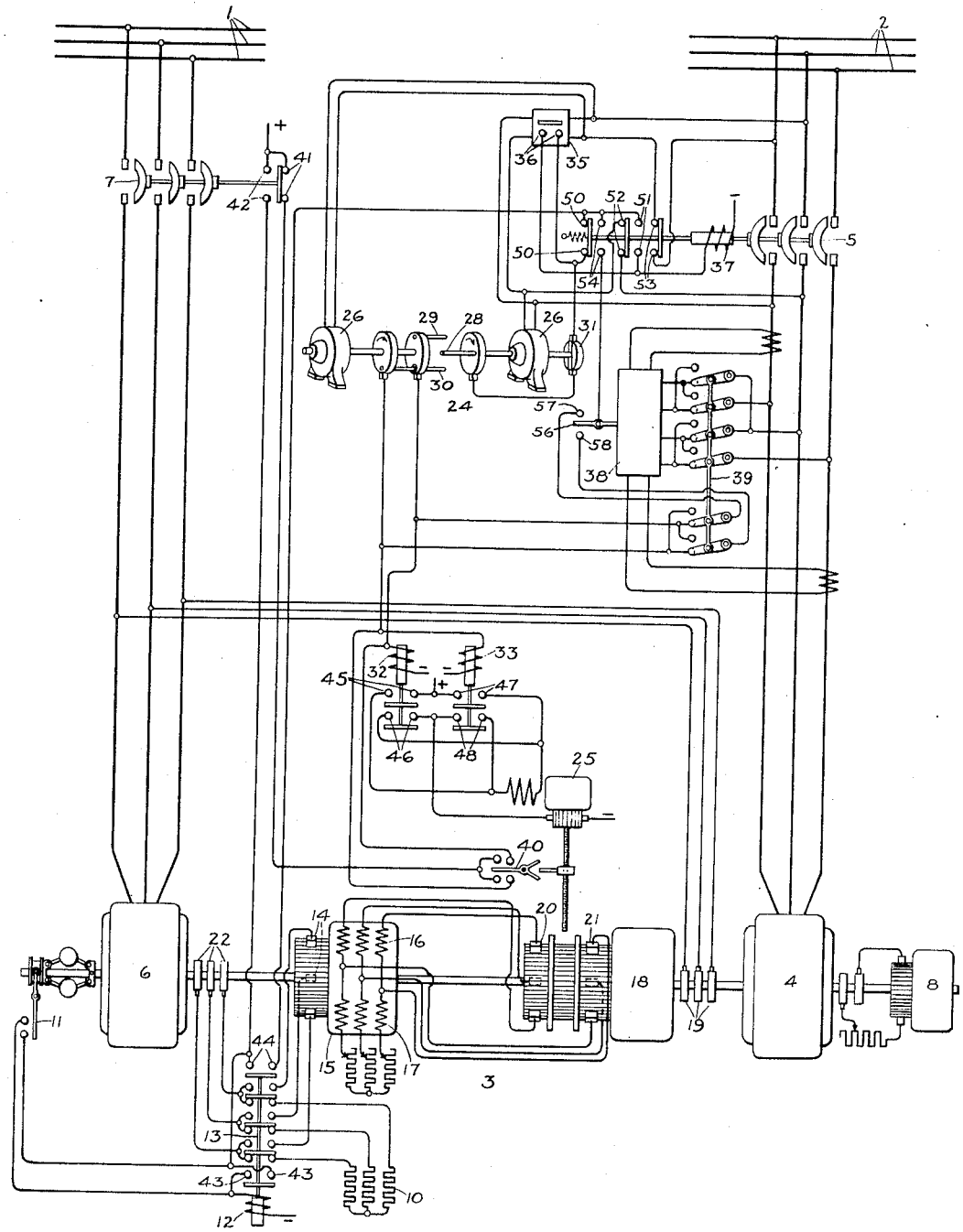

1,937,498

UNITED STATES PATENT OFFICE 1,937,498

CONTROL SYSTEM

Herman Bany and Harold T. Seeley, Yeadon, Pa., assignors to General Electric Company, a corporation of New York Application February 26, 1932. Serial No. 595,320

11 Claims. (Cl. 171—118)

Our invention relates to control systems and particularly to control systems for frequency converters and its object is to provide an improved arrangement for automatically controlling the connection of a frequency converter between two alternating current systems so that a large synchronizing current does not flow when the converter is interconnected between the two systems.

Our invention will be better understood from the following description when taken in connection with the accompanying drawing the single figure of which diagrammatically illustrates a frequency converter control system embodying our invention and its scope will be pointed out in the appended claims.

In the accompanying drawing, 1 and 2 represent two alternating current systems which are arranged to be interconnected by a frequency converter 3. This converter includes a synchronous machine 4 having a primary winding which is arranged to be connected to the system 2 by means of a suitable switch 5, and an asynchronous machine 6 having a primary winding which is arranged to be connected to the system 1 by means of a suitable switch 7. The rotors of the two machines 4 and 6 are mechanically connected together. The field winding of the synchronous machine 4 may be supplied with direct current in any suitable manner, examples of which are well known in the art. As shown in the drawing, the field winding of the synchronous machine 4 is permanently connected across the brushes of a direct connected exciter 8. The asynchronous machine 6 is provided with a phase wound secondary winding.

The frequency converter 3 is started by connecting the primary winding of the asynchronous machine 6 to the system 1 while the secondary winding is connected to a suitable starting resistor 10. The switch 7 which connects the primary winding of the asynchronous machine 6 to the system 1 may be controlled in any suitable manner, examples of which are well known in the art. In order to simplify the disclosure we have shown it as a manually controlled device. The connection of the secondary winding of the asynchronous machine to the starting resistor 10 is controlled by suitable switching means whereby the resistor is disconnected from the secondary winding after the speed of the machine reaches a predetermined value. Any suitable speed responsive means such as a centrifugally operated switch, an undercurrent relay responsive to the starting current, etc., examples of which are well known in the art, may be employed to effect the operation of the switching means when the machine reaches a predetermined speed. As shown in the drawing, a centrifugally operated switch 11 is provided for effecting the energization of the closing coil 12 of a switch 13 to effect the disconnection of the resistor 10 from the secondary circuit of the asynchronous machine 6 when the speed of the machine increases above a predetermined value.

After the frequency converter 3 has been started, we provide in accordance with our invention an arrangement for automatically controlling the speed of the asynchronous machine 6 so as to bring the synchronous machine 4 and the system 2 into synchronism at which time the switch 5 is automatically closed to connect the primary winding of the synchronous machine 4 to the system 2.

For controlling the speed of the asynchronous machine 6, one modification of the so-called Scherbius control is shown. The theory of operation of this regulating apparatus is well known in the art and is fully set forth in the United States Letters Patent 1,306,594 and 1,778,599. In the modification shown in the drawing, the regulating apparatus includes two dynamo-electric machines 15 and 18 which have their rotors directly connected to the rotors of the machines 4 and 6. The regulating machine 15 is of the commutator type and the brushes 14 thereof are arranged to be connected to the slip rings 22 of the machine 6 when the speed thereof is above a predetermined value. The regulating machine 15 is also provided with two sets of field windings 16 and 17 which are excited by the other machine 18 which is a frequency converter of the well known ohmic drop exciter type. The frequency changer 18 has collector rings 19 which are arranged to be connected to the system 1 when the switch 7 is closed and two sets of brushes 20 and 21 which are arranged to be connected to the windings 16 and 17 in such a manner that the windings 17 are energized in response to the voltages between the brushes 21 and the windings 16 are energized in response to the voltages between corresponding brushes of the two sets of brushes 20 and 21. A suitable brush shifting mechanism, including a reversible motor 25, is provided for shifting the brushes 20 and 21 on the commutator of the frequency converter 18 so that the windings 16 and 17 of the machine 15 are excited in the desired manner. Since the construction of such a brush shifting mechanism is well known in the art and one particular construction is disclosed in the aforesaid Letters Patent 1,778,595, the constructional details of this mechanism are not shown in the drawing.

In accordance with our invention, after the regulating machine brushes 14 are connected to the secondary winding of the asynchronous machine 6 and before the switch 5 is closed, the brushes 20 and 21 of the frequency changer 18 are automatically controlled in response to the frequency difference between the synchronous machine 4 and the system 2 so as to bring them into synchronism. When they are in synchronism, the switch 5 is automatically closed and then the brushes 20 and 21 are automatically controlled in response to the power transferred between the two systems 1 and 2 by the converter 3 so as to maintain it at a predetermined value.

For controlling the brushes 20 and 21 in response to the frequency difference between the synchronous machine 4 and the system 2, any suitable frequency difference responsive means, examples of which are well known in the art, may be provided for selectively controlling the operation of the brush shifting motor 25. As shown, the frequency difference responsive means includes two single-phase synchronous motors 26 and 27 respectively connected to one of the primary phases of the synchronous machine 4 and to one phase of the system 2. The two synchronous motors are arranged in any suitable manner so that the contacts 28 and 29 are closed when the frequency of the system 2 is higher than the frequency of the synchronous machine 4 and the contacts 28 and 30 are closed when the frequency of the system 2 is lower than the frequency of the synchronous machine 4. The contacts 28 and 29 control the circuit of a control relay 32 which, in turn, controls the circuits of the reversible motor 25 so that the brushes are adjusted in a manner to increase the speed of the machines 4 and 6. The contacts 28 and 30 control the circuit of a control relay 33 which, in turn, controls the circuits of the reversible motor 25 so that the brushes 20 and 21 are adjusted in a manner to decrease the speed of the machines 4 and 6. A suitable interrupter 31 is also preferably provided in series with the contact 28 so that the circuit therethrough is only closed during a portion of each revolution thereof.

In accordance with our invention, we also provide a suitable automatic synchronizer 35, examples of which are well known in the art, for effecting the closing of the switch 5 between the synchronous machine 4 and the system 2 when a predetermined phase relation exists between the voltages of the system 2 and the synchronous machine 4. Since the details of such an automatic synchronizer form no part of our present invention, and furthermore they are old and well known in the art, we have shown the automatic synchronizer 35 schematically in order to simplify the disclosure of the present invention. Preferably the automatic synchronizer 35 is arranged to effect the closing of the switch 5 only when both the frequency difference and phase difference between the voltages of the synchronous machine 4 and the system 2 are less than predetermined values. As shown, the automatic synchronizer 35 includes contacts 36 which, when closed, complete an energizing circuit for the closing coil 37 of the switch 5. The switch 5 in closing removes the control of the brush shifting motor 25 from the frequency difference responsive means 24 and places the motor 25 under the control of a suitable contact making wattmeter 38 which is connected in any suitable manner so that it is energized in response to the power flowing in the primary circuit of the synchronous machine 4. This contact making wattmeter 38 is arranged to control the circuits of the control relays 32 and 33 in such a manner that the amount of power transferred from one system to the other by the frequency converter 3 after the switch 5 is closed is maintained at a predetermined value.

In order that the power may be maintained at any desired value, the wattmeter 38 is preferably arranged in any suitable manner, examples of which are well known in the art, so that it can open and close its contacts in response to different values of power flowing between the system 2 and the synchronous machine 4. Also a suitable reversing switch 39 is provided for reversing the proper connections of the wattmeter and the circuits of the control relays 32 and 33 so that the wattmeter may control the transfer of power in either direction between the two systems 1 and 2.

Suitable means are also provided for effecting the movement of the brushes 20 and 21 to a predetermined position when the frequency converter 3 is shut down. As shown, this means includes a limit switch 40 controlled by the position of the brushes 20 and 21 and auxiliary contacts 41 on the switch 7.

The operation of the arrangement shown in the drawing is as follows: The frequency converter 3 is started by closing the switch 7 which connects the primary winding of the asynchronous machine 6 to the system 1, the secondary winding of the machine 6 being connected to the starting resistor 10 through the contacts of the switch 13. The asynchronous machine 6 then accelerates the frequency converter 3 and when it reaches a predetermined speed, the speed responsive device 11 closes its contacts and completes through the contacts 42 on switch 7 an energizing circuit for the closing coil 12 of the switch 13. The switch 13 then operates to disconnect the starting resistor 10 from the secondary circuit of the asynchronous machine 6 and to connect this secondary circuit to the brushes 14 of the regulating machine 15. By closing its contacts 43, the switch 13 also completes a locking circuit for the closing coil 12, this locking circuit being independent of the contacts of the speed responsive device 11. By closing its contacts 44, the switch 13 also renders the speed control means 24 operative to control the brushes 20 and 21 so as to bring the synchronous machine 4 into synchronism with the system 2. If the speed of the synchronous machine 4 is too low, the contacts 28 and 29 of the speed control means 24 are closed so that each time the circuit is completed through the interrupter 31 a circuit is completed for the control relay 32 through the contacts 42 of switch 7, contacts 44 of switch 13, and contacts 50 of switch 5. The relay 32 by closing its contacts 45 and 46 completes an energizing circuit for the brush shifting motor 25 so that the brushes are shifted to effect an increase in the speed of the machines 4 and 6. If the speed of the synchronous machine 4 is too high, the contacts 28 and 30 of the speed control means 24 are in engagement so that each time a circuit is completed through the interrupter 31, an energizing circuit is completed for the control relay 33 through contacts 50 of switch 5, contacts 44 of switch 13 and contacts 42 of switch 7. The relay 33 by closing its contacts 47 and 48 completes an energizing circuit for the brush shifting motor 25 so that the brushes 20 and 21 are shifted to effect a decrease in speed of the machines 4 and 6.

As soon as a predetermined frequency and phase relation exists between the voltages of the synchronous machine 4 and the system 2, the automatic synchronizer 35 closes its contacts 36 and completes an energizing circuit for the closing coil 37 of the switch 5. This circuit also includes the auxiliary contacts 42 on switch 7, contacts 44 of switch 13 and auxiliary contacts 50 on switch 5. The closing of the switch 5 connects the primary winding of the synchronous machine 4 to the system 2 so that the frequency converter is now interconnected between the two systems. By closing its auxiliary contacts 51, the switch 5 completes a locking circuit for its closing coil 37, this locking circuit being independent of the automatic synchronizer contacts 36 and the auxiliary contacts 50 on the switch 5. By opening its contacts 50, 52 and 53 and closing its contacts 54 the switch 5 removes the brush shifting motor 25 from the control of the speed control means 24 and places it under the control of the contact making wattmeter 38.

When the switch 39 is in the position shown, the wattmeter 38 operates to maintain at a predetermined value the power flowing from the system 1 to the system 2 and when it is in its other position it maintains at a predetermined value the power flowing from the system 2 to the system 1. If the power flowing from the synchronous machine 4 to the system 2 when the switch 39 is in the position shown decreases below a predetermined value, the wattmeter 38 closes its contacts 56 and 57 so that a circuit is completed for the control relay 32 to effect the necessary change in the position of the brushes 20 and 21 to increase the power flowing from the synchronous machine 4 to the system 2 to the desired value. The circuit of the control relay 32 also includes the contacts 54 on the switch 5, contacts 44 on switch 13 and contacts 42 on switch 7. If the power flowing from the synchronous machine to the system 2 increases above this predetermined value, the wattmeter 38 closes its contacts 56 and 58 so that a circuit is completed through the contacts 42 on switch 7, contacts 44 on switch 13 and contacts 54 on switch 5 for the control relay 33. The control relay 33 then operates to shift the brushes in such a manner as to decrease to the desired value the power flowing from the synchronous machine 4 to the system 2. When the switch 39 is in its other position, the wattmeter 38 controls in an obvious manner the circuits of the control relays 32 and 33 so that the brushes 20 and 21 are adjusted to maintain at a predetermined value the power flowing from the system 2 to the synchronous machine 4.

The frequency converter 3 is shut down by opening the switch 7. By opening its auxiliary contacts 42 the switch 7 interrupts the locking circuits for the closing coils 12 and 37 of the switches 13 and 5 so that the starting resistor 10 is reconnected to the secondary winding of the asynchronous machine 6 and the synchronous machine 4 is disconnected from the system 2. By closing its auxiliary contacts 41, the switch 7 completes through the contacts of the limit switch 40 an obvious circuit for either the control relay 32 or the control relay 33 to restore the brushes 20 and 21 to their normal positions.

While we have, in accordance with the Patent statutes, shown and described our invention as applied to a particular system and as embodying various devices diagrammatically indicated, changes and modifications will be obvious to those skilled in the art and we therefore aim in the appended claims to cover all such changes and modifications as fall within the true spirit and scope of our invention.

What we claim as new and desire to secure by Letters Patent of the United States is:

1. In combination, an alternating current circuit, a synchronous machine, a phase wound asynchronous machine driving said synchronous machine, and means including an alternating current source of excitation controlled in accordance with the relative frequencies of said synchronous machine and said circuit for supplying alternating current of the proper frequency and magnitude to the secondary winding of said asynchronous machine to bring said synchronous machine substantially into synchronism with said circuit.

2. In combination, an alternating current circuit, a synchronous machine, a phase wound asynchronous machine driving said synchronous machine, means including an alternating current source of excitation controlled in accordance with the relative frequencies of said synchronous machine and said circuit for supplying alternating current of the proper frequency and magnitude to the secondary winding of said asynchronous machine to bring said synchronous machine substantially into synchronism with said circuit, and means controlled by the phase relation between the voltages of said synchronous machine and said circuit for connecting said synchronous machine to said circuit when they are substantially in synchronism.

3. In combination, an alternating current circuit, a synchronous machine, a phase wound asynchronous machine driving said synchronous machine, means including an alternating current source of excitation controlled in accordance with the relative frequencies of said synchronous machine and said circuit for supplying alternating current of the proper frequency and magnitude to the secondary winding of said asynchronous machine to bring said synchronous machine substantially into synchronism with said circuit, means controlled by the phase relation between the voltages of said synchronous machine and said circuit for connecting said synchronous machine to said circuit when they are substantially in synchronism, and means responsive to the connection of said synchronous machine to said circuit for controlling the alternating current supplied to the secondary winding of said asynchronous machine in accordance with the power flowing between said synchronous machine and said circuit.

4. In combination, two alternating current circuits, rotary transforming means for interconnecting said circuits including an asynchronous machine and a synchronous machine which have their rotors mechanically connected together, means for connecting the primary of said asynchronous machine to one of said circuits, means for applying an adjustable voltage in the secondary circuit of said asynchronous machine of the same frequency as the frequency of said secondary circuit, and means controlled in response to the relative frequencies of said synchronous machine and said other circuit for controlling said voltage applying means to bring said synchronous machine substantially into synchronism with said other circuit.

5. In combination, two alternating current circuits, rotary transforming means for interconnecting said circuits including an asynchronous machine and a synchronous machine which have their rotors mechanically connected together, means for connecting the primary of said asynchronous machine to one of said circuits, an alternating current exciter electrically connected to the secondary winding of said asynchronous machine, an ohmic drop exciter including movable brushes for supplying excitation to said alternating current exciter at a frequency proportional to the slip frequency of said asynchronous machine, and means controlled in response to the relative frequencies of said synchronous machine and said other circuit for adjusting said brushes to bring said synchronous machine substantially into synchronism with said other circuit.

6. In combination, two alternating current circuits, rotary transforming means for interconnecting said circuits including an asynchronous machine and a synchronous machine which have their rotors mechanically connected together, means for connecting the primary of said asynchronous machine to one of said circuits, an alternating current exciter electrically connected to the secondary winding of said asynchronous machine, an ohmic drop exciter including movable brushes for supplying excitation to said alternating current exciter at a frequency proportional to the slip frequency of said asynchronous machine, means controlled in response to the relative frequencies of said synchronous machine and said other circuit for adjusting said brushes to bring said synchronous machine substantially into synchronism with said other circuit, and means controlled by the phase relation between the voltages of said synchronous machine and said other circuit for connecting said synchronous machine to said other circuit when they are substantially in synchronism.

7. In combination, two alternating current circuits, rotary transforming means for interconnecting said circuits including an asynchronous machine and a synchronous machine which have their rotors mechanically connected together, means for connecting the primary of said asynchronous machine to one of said circuits, an alternating current exciter electrically connected to the secondary winding of said asynchronous machine, an ohmic drop exciter including movable brushes for supplying excitation to said alternating current exciter at a frequency proportional to the slip frequency of said asynchronous machine, means controlled in response to the relative frequencies of said synchronous machine and said other circuit for adjusting said brushes to bring said synchronous machine substantially into synchronism with said other circuit, means responsive to the power flowing through the armature of said synchronous machine, and means controlled by the phase relation between the voltages of said synchronous machine and said other circuit for connecting said synchronous machine to said other circuit when they are substantially in synchronism and for placing said brushes under the control of said power responsive means after said synchronous machine is connected to said other circuit.

8. In combination, two alternating current circuits, rotary transforming means for interconnecting said circuits including an asynchronous machine and a synchronous machine which have their rotors mechanically connected together, means for connecting the primary of said asynchronous machine to one of said circuits, an alternating current exciter, an ohmic drop exciter including movable brushes for supplying excitation to said alternating current exciter at a frequency proportional to the slip frequency of said asynchronous machine, means controlled by the relative frequencies of said synchronous machine and said other circuit, and means controlled by the speed of said asynchronous machine for connecting said alternating current exciter to the secondary winding of said asynchronous machine and for placing said movable brushes under the control of said frequency controlled means.

9. In combination, two alternating current circuits, rotary transforming means for interconnecting said circuits including an asynchronous machine and a synchronous machine which have their rotors mechanically connected together, means for connecting the primary of said asynchronous machine to one of said circuits, an alternating current exciter, an ohmic drop exciter including movable brushes for supplying excitation to said alternating current exciter at a frequency proportional to the slip frequency of said asynchronous machine, means controlled by the relative frequencies of said synchronous machine and said other circuit, means controlled by the speed of said asynchronous machine for connecting said alternating current exciter to the secondary winding of said asynchronous machine and for placing said movable brushes under the control of said frequency controlled means, and means controlled by the phase relation between the voltages of said synchronous machine and said other circuit for effecting the connection of said synchronous machine to said other circuit and the removal of the control of said brushes from said frequency controlled means.

10. In combination, two alternating current circuits, rotary transforming means for interconnecting said circuits including an asynchronous machine and a synchronous machine which have their rotors mechanically connected together, means for connecting the primary of said asynchronous machine to one of said circuits, an alternating current exciter, an ohmic drop exciter including movable brushes for supplying excitation to said alternating current exciter at a frequency proportional to the slip frequency of said asynchronous machine, means controlled by the relative frequencies of said synchronous machine and said other circuit, means controlled by the speed of said asynchronous machine for connecting said alternating current exciter to the secondary winding of said asynchronous machine and for placing said movable brushes under the control of said frequency controlled means, means responsive to the power flowing through the armature of said synchronous machine, and means controlled by the phase relation between the voltages of said synchronous machine and said other circuit for effecting the connection of said synchronous machine to said other circuit and for placing said brushes under the control of said power responsive means after said synchronous machine is connected to said other circuit.

11. In combination, an alternating current circuit, a synchronous machine, a phase wound asynchronous machine driving said synchronous machine and means including an alternating current source of excitation controlled in accordance with the relative frequencies of said synchronous machine and said circuit for controlling the excitation of the secondary winding of said asynchronous machine so as to bring said synchronous machine substantially into synchronism with said circuit.

HERMAN BANY.
HAROLD T. SEELEY.